Jan. 21, 1958  G. M. SNYDER  2,820,332
LOCATOR
Filed May 12, 1955  2 Sheets-Sheet 1
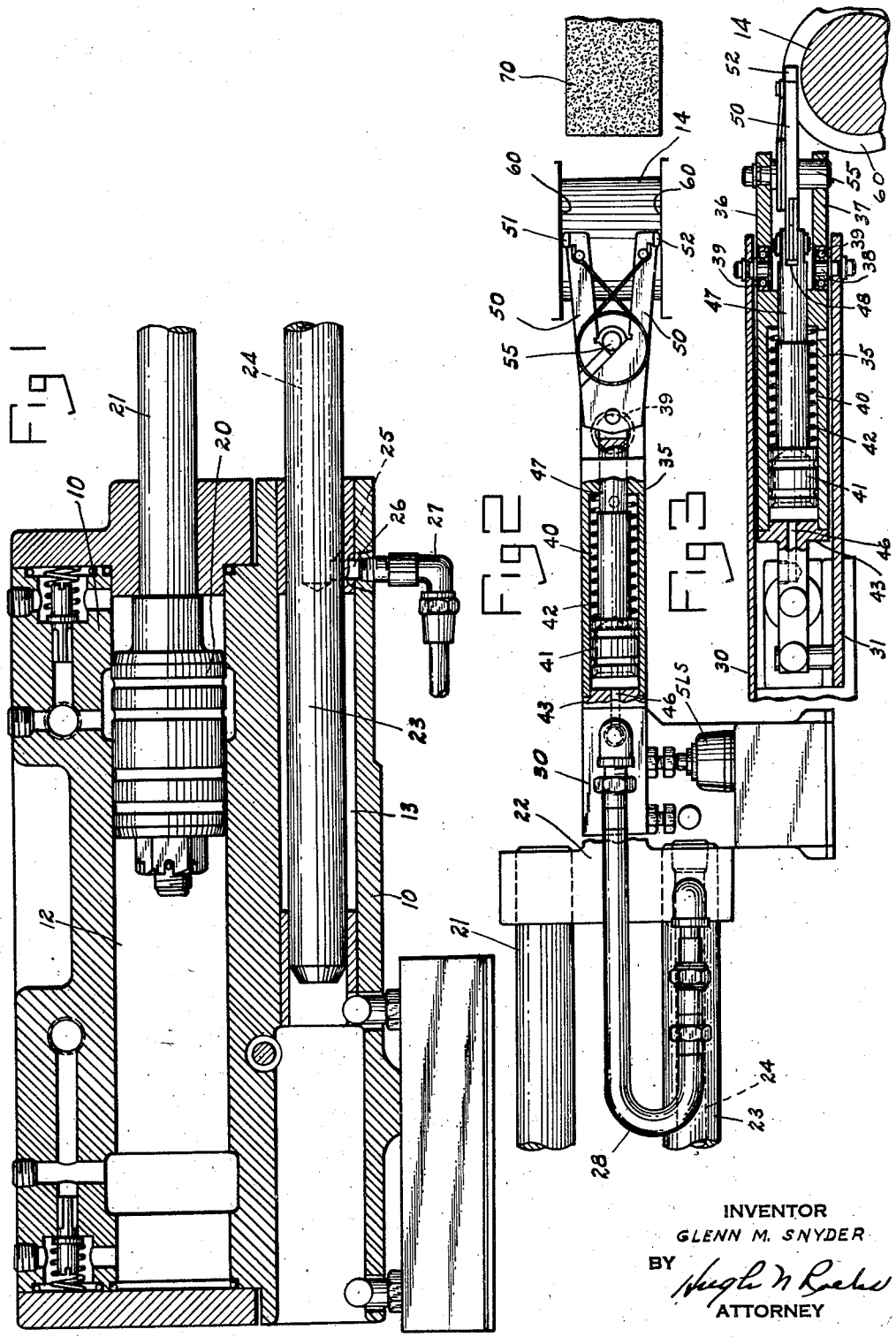
INVENTOR
GLENN M. SNYDER
BY
ATTORNEY

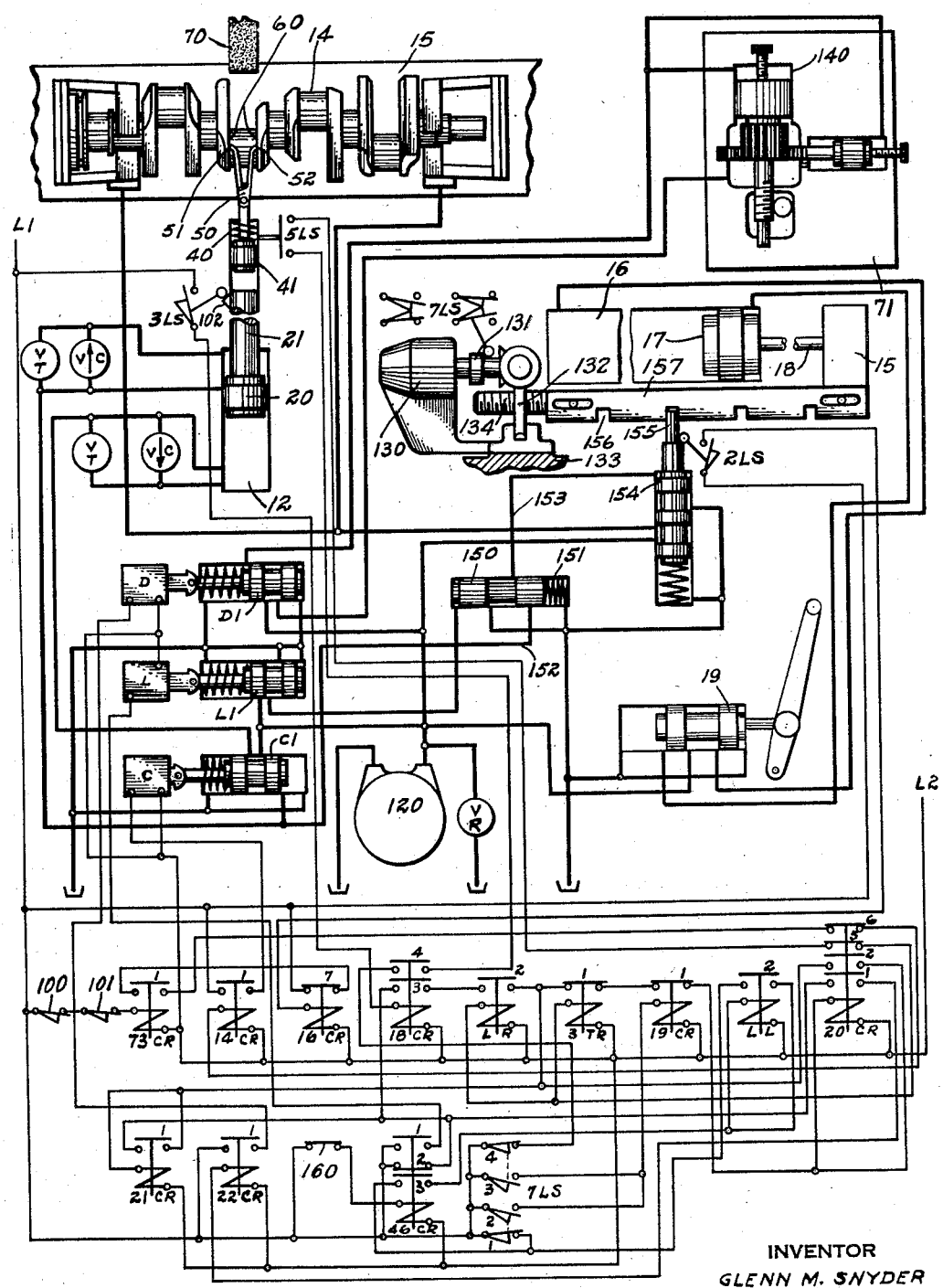

United States Patent Office 2,820,332
Patented Jan. 21, 1958

2,820,332

LOCATOR

Glenn M. Snyder, Waynesboro, Pa., assignor to Landis Tool Company, Waynesboro, Pa.

Application May 12, 1955, Serial No. 507,772

4 Claims. (Cl. 51—105)

This invention relates to apparatus for use in connection with grinding or machining of cylindrical portions of a workpiece between flanges, cheeks, shoulders, or other portions of greater diameter adjoining the cylindrical surface to be machined and more particularly to improvements in the device shown in Patent 2,559,431, granted July 3, 1951.

The apparatus disclosed in the patent performed a locating function accurately enough. However, in order to do so, the work had to move back and forth a number of times before it would stop in position in alignment with the grinding wheel.

It is a purpose of this invention to provide means for accurately locating a single portion or a series of axially spaced portions on a workpiece wherein the work will be positioned out of alignment in a predetermined direction prior to the grinding of each portion whereby the locating function will always be performed in a single relative movement between work and wheel beginning at the same point and moving in the same direction.

A further object is to provide means for resetting the work axially relative to the grinding wheel after each portion is ground and before the next portion is advanced into alignment with the cutting tool.

In the drawings, Figure 1 is a plan view of the rear portion of the apparatus.

Figure 2 is a plan view of the front portion of the apparatus.

Figure 3 is a side elevation partly in section showing the pivoted mounting for the work engaging element and the means for urging said element into engagement with the work.

Figure 4 is a hydraulic and electric diagram.

In the drawings, numeral 10 is a base member in which are formed a pair of cylindrical bores 12 and 13. Within cylinder 12 is slidably mounted a piston 20 having a piston rod 21, the other end of which is inserted in a yoke 22. The other side of a yoke 22 has inserted therein a valve member 23 in the form of an elongated piston having an axial passage 24 extending partially therethrough. A radial passage 25 is formed at the left end of passage 24. In the position shown, with the parts in work engaging position, radial passage 25 has moved into line with a port 26 in member 10 into which is inserted a fluid connection 27 which is connected to a source of fluid pressure (not shown). An extension of base 10 in the form of a pair of vertically spaced members 30 and 31 provides a support for a work engaging device consisting of a member 35 having one end slotted to form spaced members 36 and 37. Said member 35 is pivotally supported between members 30 and 31 on stub shafts 38 attached to said members 30 and 31 and inserted in bearings 39 in members 36 and 37. A cylindrical bore 40 in member 35 contains a piston 41 held in its left hand position by a spring 42. A cap member 43 closes the left end of cylinder 40 and has a passage 46 through which fluid from passage 24 and flexible connection 28 may be introduced to move said piston 41 against the action of spring 42.

A piston rod 47 on piston 41 extends through the right hand end of member 35 between members 36 and 37 and has a slot for pivotally supporting the ends of a scissors-like member 50. The work engaging elements 51 and 52 of said member extend on opposite sides of a vertical pin 55 mounted in members 36 and 37. Said work engaging elements are urged into contact with cheeks 60 of one pin of a crankshaft 61 by piston 41 urging said elements to move outwardly by pressure against vertical pin 55. Details of the work engaging elements are shown and described in Patent 2,559,431, granted July 3, 1951. The work engaging elements are normally in line with the grinding wheel 70. Said wheel is rotatably mounted on wheel base 71 and movable transversely toward and from the workpiece 14 which is rotatably supported on a work carriage piston. However, if the cheeks 60 are out of line with the grinding wheel, one of the work engaging elements 51 or 52 will engage one of said cheeks and the member 35 will be swung about shaft 38. When so moved, said member engages and actuates 5LS, which will be described later.

Movement of carriage 15 to position successive portions of the workpiece is effected by means of a hydraulic motor consisting of a cylinder 16 and a piston 17. Said piston 17 is connected through a piston rod 18 with carriage 15. Fluid under pressure from pump 120 is supplied alternately to opposite ends of cylinder 16 through reversing valve 19. Spacing bar 157 is mounted on said carriage 15 and connected through a lead screw 134 at the left end thereof to an adjusting nut 132 driven through suitable reduction gearing by locating motor 130. Said motor is mounted on bed 133.

Operation

Operation of the locating device is initiated after a loading or transfer device (not shown) has placed a workpiece in the machine. Withdrawal of the loader closes limit switches 100 and 101 to energize 73CR. 73CR1 completes a circuit from L1 through normally closed 16CR7 and normally closed 20CR6 to energize 14CR. 14CR1 energizes solenoid C shifting valve C1 to the left and directing fluid under pressure from pump 120 to the head end of cylinder 12 shifting piston 20 to place the locating apparatus in operative relation with cheeks 60 of crank shaft 14. Thereafter, 73CR remains energized throughout the entire crank grinding cycle and 14CR is controlled by the operation of the other two relay contacts 16CR7 and 20CR6.

Crank shaft 14 has been shifted out of alignment to the left, a function which will be described later. When the locating device moves into operative position, cam 102 closes 3LS to complete a circuit energizing 18CR. At the end of the positioning movement of the locating device, valve 23, which moves with piston 20, places passage 25 in alignment with port 26 directing a supply of fluid under pressure, preferably air, through passage 24 and flexible connection 28 to cylinder 40 moving said cylinder forward to urge work engaging members 51 and 52 against pin 55 to spread said work engaging members into engagement with cheeks 60. After crank 14 has been shifted out of alignment to the left, work engaging member 52 will engage the corresponding cheek before member 51 engages the opposite cheek and as a result the member 35 will be swung about its pivot in a counter-clockwise direction to engage and close 5LS. Closed 5LS completes a circuit through 7LS4 through 18CR4 and normally closed 20CR5 to energize timer 3TR and locator motor relay LR to start the carriage movement toward the right.

If there is any run-out in the crank cheeks, 5LS may be opened and closed intermittently. Each time 5LS closes, LR will be energized to actuate the locating motor and move the carriage a slight amount to the right.

If 5LS remains closed for longer than the .3 second for which 3TR is set, equivalent to approximately 200° of rotation of the work, the timer will close indicating the completion of the locating operation and completing a circuit through 18CR3, LR2, 3TR1 and normally closed 19CR1 to energize 20CR. The purpose of normally closed 19CR1 in this circuit is to prevent further operation of the machine, particularly the wheel feed, in the event that the locating movement continues beyond the point at which the wheel and work are in alignment. In the event of such a movement, collar 131 on the shaft of motor 130 would close contacts 2 or 3 of 7LS, energizing 19CR and opening 19CR1 to prevent energizing 20CR.

If the nature of the run-out is such that 5LS does not remain open as much as .3 second, the intermittent movement to the right will continue until the locator has moved far enough in a clockwise direction to open 5LS de-energizing LR and thus stopping the operation of the locating motor 130 with the workpiece in line with the grinding wheel. When LR is de-energized, LR2 is opened. When 20CR was energized through the closing of 18CR3 and LR2, 21CR was also energized and 21CR1 provided a by-pass around 18CR3 and LR2. With the opening of LR2, 21CR1 maintains a holding circuit to keep 20CR energized so that after the locating movement is completed and 3TR times out, a circuit will be completed through normally closed 19CR1 to keep 20CR energized.

Safety limit switch 7LS consists of four contacts, 1 and 4 of which are normally closed and which serve to stop the locating motor at the right and left location limits. If, for any reason, the locating movement continues beyond these limits, the wheel base will not be permitted to advance. This is accomplished by making normally opened contacts 2 and 3 of 7LS operable with normally closed contacts 1 and 4 respectively so that when contact 1 opens, 2 closes, and when 4 opens, 3 closes. Either of the contacts 2 and 3, when closed, completes a circuit to 19CR. Normally closed 19CR1, in the circuit to 20CR, would therefore be opened and it would be impossible to energize 20CR. Since the operation of the wheel base depends on energizing 22CR and since the circuit to 22CR includes a normally opened contact 22CR1, the wheel base cannot be advanced unless 20CR is energized and 20CR cannot be energized at the same time that 19CR is energized.

20CR1 completes a circuit to energize 22CR. 22CR1 completes a circuit to solenoid D shifting said valve D1 to the left and directing fluid under pressure to wheel feed cylinder 140. 20CR2 is a holding contact for 20CR to avoid intermittent operation of 3TR and 20CR due to jogging of 5LS by run-out.

Normally closed 20CR6 opens de-energizing 14CR and solenoid C so that valve C1 is shifted to the right and fluid under pressure directed to the opposite end of cylinder 12 to withdraw the locator.

At the end of the grinding operation, a sizing device contact 160 completes a circuit to energize 46CR. 46CR1 energizes solenoid L shifting valve L1 to the left and directing fluid under pressure to the left end of valve 150 and shifting said valve to the right against spring 151. In this position valve 150 connects line 152 from valve C1 which is now in right hand position connecting said line 152 with a supply of fluid under pressure. Valve 150 connects 152 with 153 leading to the plunger cylinder 154 and withdrawing plunger 155 from notch 156 in spacing bar 157. Withdrawal of plunger 155 closes 2LS to energize 16CR and opening normally closed 16CR7 in the circuit to 14CR.

At the same time that 46CR withdraws the plunger, 46CR3 completes a circuit from 7LS1 to energize LL which actuates the locator motor 130 to move the carriage to the left until collar 131 opens 7LS1 to de-energize LL. This movement is sufficient to include any accumulation of errors in structure, initial position of workpiece, etc. As described above, withdrawal of the plunger closes 2LS energizing 16CR and opening normally closed 16CR7 in the circuit through 73CR1 and 30CR6 to locator solenoid 14CR so that 14CR remains de-energized and the locator withdrawn until the carriage has moved to another position of a workpiece for grinding and the plunger enters the corresponding notch.

When the plunger enters the notch 2LS is opened de-energizing 16CR, closing 16CR7, and energizing 14CR to move the locator into operative position. Because of the above described leftward movement of the locator motor, when the plunger drops into the next notch, the corresponding crank pin will be out of line with grinding wheel to the left.

I claim:

1. In a grinding machine for grinding cylindrical portions of a workpiece having opposed shoulders or flanged portions, a wheel support, a grinding wheel rotatably mounted thereon, a work support, means for effecting a relative axial movement between said work and said wheel, means to effect said axial movement intermittently to successively position said cylindrical portions and said grinding wheel in approximate operative relation including a spacing bar having notches therein spaced in accordance with the portions on the workpiece, a plunger movable into and out of said notches, a device for locating a workpiece, said device having means adapted for co-operating with said shoulder portions for determining the relative position of said shoulder portions and said grinding wheel, means for moving said work locating device into and out of operative relation with each of said portions including a motor, means actuated by said plunger upon entering each of said notches for actuating said motor in a direction to place said locating device in operative position and means actuated by said locator in effecting alignment between one of said portions and said grinding wheel to actuate said motor in the opposite direction and withdraw said locator to inoperative position.

2. In a grinding machine for grinding cylindrical portions of a workpiece having opposed shoulders or flanged portions, a wheel support, a grinding wheel rotatably mounted thereon, a work support, means for effecting a relative axial movement between said work and said wheel, means to effect said axial movement intermittently for successively positioning said cylindrical portions and said grinding wheel in operative relation including an indexing device, a device for locating a workpiece, said device having means adapted for co-operating with said shoulder portions for determining the relative position of said shoulder portions and said grinding wheel, means for moving said work locating device into and out of operative relation with each of said portions including a motor, means actuated by said indexing device upon stopping said carriage with one of said portions in approximate operative relation with said grinding wheel for actuating said motor in a direction to place said locating device in operative position, and means operable by said locator in effecting alignment between one of said portions and said grinding wheel to actuate said motor in the opposite direction to withdraw said locator to inoperative position.

3. In a machine tool for machining spaced cylindrical portions of a workpiece each having opposed shoulder portions, a work support, a tool support, a cutting tool mounted thereon, means for effecting relative longitudinal movement between said supports, an indexing mechanism to successively position said supports in approximate operative relation including a plunger, a device for locating a workpiece, said device having means normally in alignment with said cutting tool adapted for co-operating with said shoulder portions, means operable upon withdrawal of said plunger to release said work for indexing, for shifting said work to a position out of alignment with said cutting tool in a predetermined direction, means operable when said plunger enters a notch, for moving said work locating device into operative position, said work locating device co-acting with only one of said shoulders because of the predetermined mis-alignment of said work and said cutting tool, means operable by said locating device as a result of said mis-alignment for shifting said work and locator in the opposite direction until said shoulders are in alignment with the cutting tool, means actuated by said locator in aligned position to stop said shifting movement, said means being effective also to withdraw said locator to inoperative position.

4. In a grinding machine for grinding a cylindrical portion of a workpiece having opposed shoulders or flanged portions, a wheel support, a grinding wheel rotatably mounted thereon, a longitudinally movable work support and means for moving said work support, means for rotatably supporting a workpiece thereon, means to effect an initial positioning movement of said work supporting means to move said shoulders out of alignment with said grinding wheel in a predetermined direction, a device for locating a workpiece, said device having means adapted for cooperating with said shoulder portions, and including control means operable in response to said out of line position of said work to actuate said moving means to cause relative longitudinal movement between said grinding wheel and said workpiece in the opposite direction from said initial positioning movement, and means for stopping said moving means when said workpiece and said grinding wheel are in alignment.

References Cited in the file of this patent
UNITED STATES PATENTS

| | | |
|---|---|---|
| 2,264,160 | Flygare | Nov. 25, 1941 |
| 2,559,431 | Hollengreen | July 3, 1951 |
| 2,639,562 | Balsiger | May 26, 1953 |
| 2,722,088 | Hill | Nov. 1, 1955 |